US008209299B2

(12) United States Patent
Barsness et al.

(10) Patent No.: US 8,209,299 B2
(45) Date of Patent: Jun. 26, 2012

(54) SELECTIVELY GENERATING PROGRAM OBJECTS ON REMOTE NODE OF A MULTI-NODE COMPUTER SYSTEM

(75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/110,412

(22) Filed: Apr. 28, 2008

(65) Prior Publication Data

US 2009/0271807 A1   Oct. 29, 2009

(51) Int. Cl.
*G06F 17/30* (2006.01)
(52) U.S. Cl. ......... 707/688; 707/640; 709/203; 719/330
(58) Field of Classification Search .............. 707/655, 707/823, 825, 828, 688, 640; 709/203, 224; 719/330; 718/101, 104
See application file for complete search history.

(56) References Cited

U.S. PATENT DOCUMENTS

| | | | | |
|---|---|---|---|---|
| 6,560,773 | B1 * | 5/2003 | Alexander et al. | 707/640 |
| 6,829,765 | B1 * | 12/2004 | Chan et al. | 718/104 |
| 2003/0188097 | A1 | 10/2003 | Holland et al. | |
| 2005/0071843 | A1 * | 3/2005 | Guo et al. | 718/101 |
| 2006/0080371 | A1 * | 4/2006 | Wong et al. | 707/640 |
| 2007/0174333 | A1 | 7/2007 | Lee et al. | |
| 2008/0294872 | A1 | 11/2008 | Bryant et al. | |

OTHER PUBLICATIONS

Zhou, Wanlet, "On the Monitoring of Remote Procedure Call Programs", IEEE Region 10 Conference on Computer and Communication Systems, Sep. 1990, Hong Kong, pp. 141-145.*
Meyer, B et al., "Performance Analysis of Distributed Applications with ANSAmon", International Conference on Open Distributed Processing (ICODP'95), 1995, pp. 293-304.*
U.S. Patent Application entitled "Migrating Program Objects in a Multi-Node Computer System" by Eric L. Barsness et al.
Office Action History of U.S. Appl. No. 11/753,173 from Nov. 30, 2010 to Apr. 13, 2011.
International Search Report and Written Opinion of Patent Cooperation Treaty Application No. PCT/EP2008/056317 dated Sep. 5, 2008.
Office Action History of U.S. Appl. No. 12/110,409 from Nov. 30, 2010 to Apr. 14, 2011.
Nr Adiga et al., "An Overview of the BlueGene/L Supercomputer," Proceedings of the IEEE/ACM SC2002 Conference (SC'02), Nov. 2002: pp. 1-22, <http://ieeexplore.ieee.org/xpls/abs_all.jsp?arnumber=1592896>.

(Continued)

*Primary Examiner* — Shahid Alam
(74) *Attorney, Agent, or Firm* — Patterson & Sheridan LLP (57) ABSTRACT

Embodiments of the invention enable application programs running across multiple compute nodes of a highly-parallel system to selectively migrate objects from one node to another. For example, when an object becomes too large, a node containing the object may migrate the object to another node, thereby freeing memory space. Whether a large object is migrated can be dependent on how frequently the object is used by the application. Because the memory used by such an object is freed for other uses by the application, overall application performance may be improved. On large parallel systems with thousands of compute nodes, even relatively small improvements in application performance an individual compute node may be magnified many times, resulting in dramatic improvements in overall application performance.

21 Claims, 7 Drawing Sheets

OTHER PUBLICATIONS

Yariv Aridor et al., "Open Job Management Architecture for the Blue Gene/L Supercomputer," Job Scheduling Strategies for Parallel Processing, Dec. 2005: p. 91-107, <http://www.springerlink.com/content/pl5615w70888347m/>.

Gyan Bhanot et al., "The BlueGene/L Supercomputer," Nuclear Physics B (Proc. Suppl.), May 2003, vol. 119: pp. 114-121.

Ming-Syan Chen et al., "Subcube Allocation and Task Migration in Hypercube Multiprocessors," IEEE Transactions on Computers, Sep. 1990, vol. 39(9): pp. 1146-1155.

Ohan Kang et al., "A Graph-Based Subcube Allocation and Task Migration in Hypercube Systems," IEEE Computer Society Frontiers of Massively Parallel Computation, Oct. 1992: pp. 535-538.

Elie Krevat et al., "Job Scheduling for the BlueGene/L System," Job Scheduling Strategies for Parallel Processing, Jul. 2002, vol. 2537: pp. 38-54.

Michael A. McSherry et al., "Software Routing Support for Task Migration in Hypercube Multiprocessor Systems," Proceedings of the Annual International Computer Software and Applications Conference (COMPSAC), Sep. 1989, vol. CONF13: pp. 8-15.

Seong-Moo Yoo et al., "An Efficient Partial Compaction Scheme for Three-Dimensional Torus-Connected Parallel Systems," Proceedings of the ISCA 12th International Conference on Parallel and Distributed Systems, IEEE Computer Society, The International Society for Computers and Their Applications, 1999: pp. 225-230.

Seong-Moo Yoo et al., "On Task Relocation in Two-Dimensional Meshes," Journal of Parallel and Distributed Computing, May 1, 2000, vol. 60(5): pp. 616-638.

Yanyong Zhang et al., "An Integrated Approach to Parallel Scheduling Using Gang-Scheduling, Backfilling, and Migration," IEEE Transactions on Parallel and Distributed Systems, Mar. 2003, vol. 14(3): pp. 236-247.

* cited by examiner

SELECTIVELY GENERATING PROGRAM OBJECTS ON REMOTE NODE OF A MULTI-NODE COMPUTER SYSTEM

BACKGROUND OF THE INVENTION

1. Field of the Invention

Embodiments of the invention relate to improving the efficiency of multi-node computing systems. More specifically, embodiments of the invention may be configured to improve memory use on a multi-node computing system by selectively migrating program objects among compute nodes of such a system.

2. Description of the Related Art

Powerful computers may be designed as highly parallel systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

The compute nodes in a parallel system typically communicate with one another over multiple communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Additionally, the Blue Gene/L includes both a collective network and a global interrupt network. Further, certain nodes are also connected to a gigabit Ethernet. These nodes are typically used to perform I/O operations between the Blue Gene core and an external entity such as a file server. Other massively parallel architectures also use multiple, independent networks to connect compute nodes to one another.

SUMMARY OF THE INVENTION

One embodiment of the invention provides a method for creating objects in a multi-node computing system. The method may generally include monitoring an application being executed on a plurality of compute nodes of the multi-node system to generate a performance profile for one or more objects instantiated by the application during execution of the application. Each performance profile indicates performance characteristics for instances of a respective object type. The method may further include detecting that the application program being executed by a first compute node of the multi-node system is going to instantiate a first object of a first object type and evaluating the performance profile corresponding to the first object type. Based on the evaluation, a request by the application program to create an instance of the first object on the first compute node may be intercepted. Once intercepted, the request may be directed to a second compute node and an instance of the first object may be created on the second compute node.

Another embodiment of the invention includes a computer-readable storage medium containing a program which, when executed by a processor, performs operations for creating objects on a multi-node system. The operations may generally include monitoring an application being executed on a plurality of compute nodes of the multi-node system to generate a performance profile for one or more objects instantiated by the application during execution of the application. Each performance profile indicates performance characteristics for instances of a respective object type. The operations may further include detecting that the application program being executed by a first compute node of the multi-node system is going to instantiate a first object of a first object type and evaluating the performance profile corresponding to the first object type. Based on the evaluation, a request by the application program to create an instance of the first object on the first compute node may be intercepted. Once intercepted, the request may be directed to a second compute node and an instance of the first object may be created on the second compute node.

Still another embodiment of the invention includes a parallel computing system. The parallel computing system may generally include at least one storage node, having a processor and memory, dedicated to storing objects instantiated by an application program and a plurality of compute nodes, each having a processor and memory, configured to execute the application program and a program configured for creating objects on a multi-node system. The program may be configured for performing the steps of monitoring an application being executed on the plurality of compute nodes to generate a performance profile for one or more objects instantiated by the application during execution of the application. Each performance profile indicates performance characteristics for instances of a respective object type. The program may be further configured for detecting that the application program being executed by a first node of the plurality of compute nodes is going to instantiate a first object of a first object type and evaluating the performance profile corresponding to the first object type. Based on the evaluation, a request by the application program to create an instance of the first object on the first compute node may be intercepted. Once intercepted, the request may be directed to a second compute node and an instance of the first object may be created on the second compute node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are

DETAILED DESCRIPTION OF THE PREFERRED EMBODIMENTS

Embodiments of the invention enable application programs running across multiple compute nodes of a highly-parallel system to selectively migrate objects from one node to another. For example, an application running on one node may instantiate numerous objects and migrate some to another node. As is known, an object provides a programmatic structure used to encapsulate a set of data and operations on that data. Sophisticated computer programs may be configured as a collection of objects that communicate with one another to perform a computational task. Each object consumes a portion of memory on the node on which it was created. Thus, the more objects created by a node, the less memory remains available.

In one embodiment, when an object becomes too large (as determined from an analysis of historical application performance or predefined size limits), the node may migrate the object to another node, thereby freeing memory space. Whether a large object is migrated may depend on how frequently the object is used (i.e., how frequently methods of the object are invoked) by the application. For example, it may make sense to migrate a large, but infrequently used object created by an application. Conversely, if such an object were frequently used by the application, it may not make sense to migrate it to another node. Because the memory used by such an object is freed for other uses by the application, overall application performance may be improved. Although some additional overhead is incurred when methods of the migrated object are invoked, it may be more than compensated for by an overall improvement in application performance. On large parallel systems with thousands of compute nodes, even relatively small improvements in application performance an individual compute node may be magnified many times, resulting in dramatic improvements in overall application performance.

Further, when an object is to be instantiated, a node may determine that the object is likely to consume a large amount of computing resources on that node. For example, the method to instantiate the object (typically referred to as a constructor) may itself be time consuming or taxing to resources of that node. Accordingly, in one embodiment, the node may cause the object to be created on a remote node, especially where the creation process may be performed asynchronously to other program operations. Doing so allows a node to intelligently trade off between consuming local memory for an object and the usefulness of having the object on a remote node.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
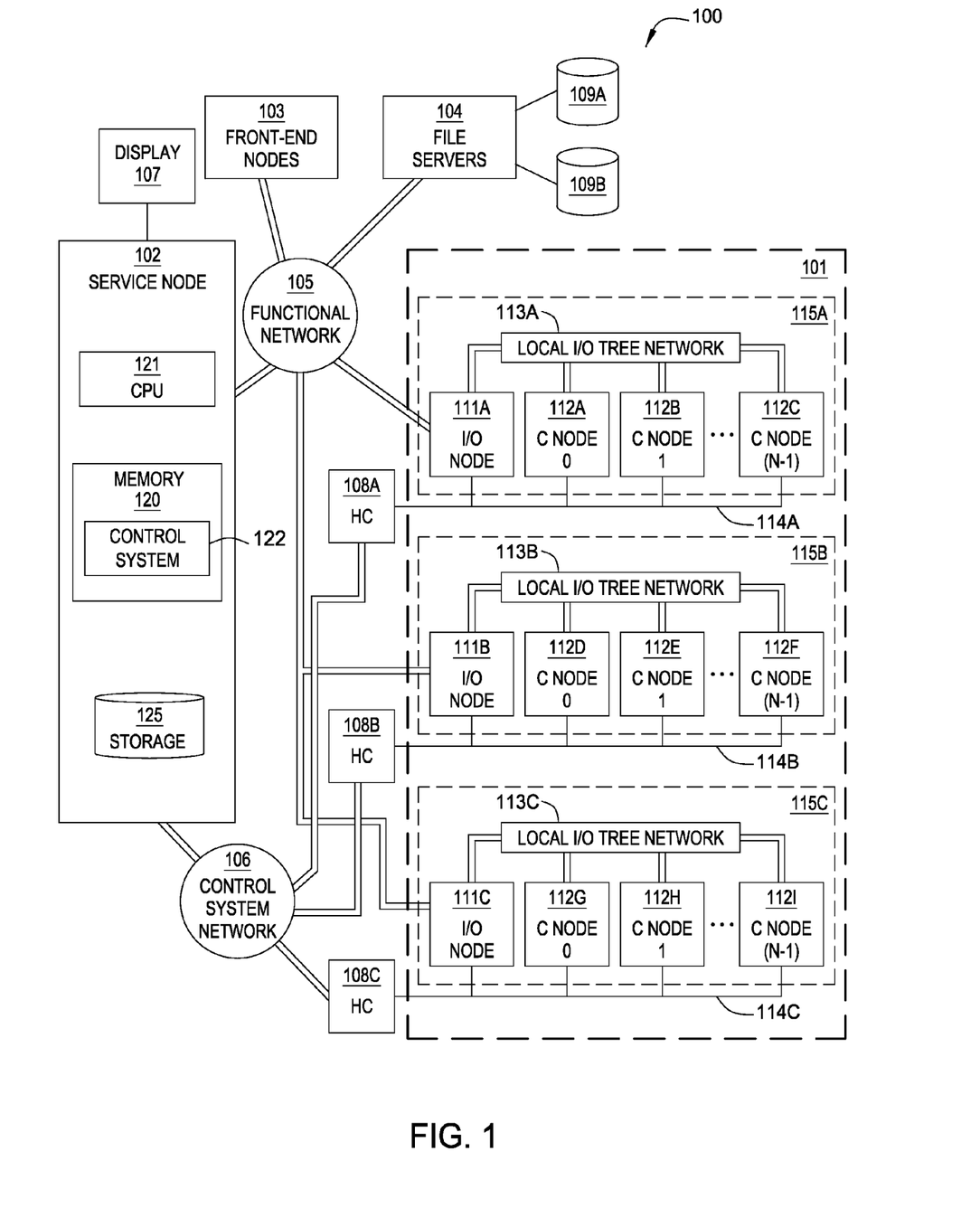
FIG. 1 is a block diagram of illustrating components of a massively parallel computer system, according to one embodiment of the invention.

FIG. 1 is a block diagram illustrating components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O operations. Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions. Illustratively, memory 120 also includes a control system 122. In embodiments of the invention, Control system 122 may be a software application configured to control the allocation of compute nodes 112 in compute core 101, direct the loading of application and data on compute nodes 111, and perform diagnostic and maintenance functions, among other things.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, network performance and/or network state data may be gathered and transmitted to service node 102 without affecting the performance of that application.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

As stated, in a massively parallel computer system 100, compute nodes 112 may be logically arranged in a three-dimensional torus, where each compute node 112 may be identified using an x, y and z coordinate.

Figure 2:
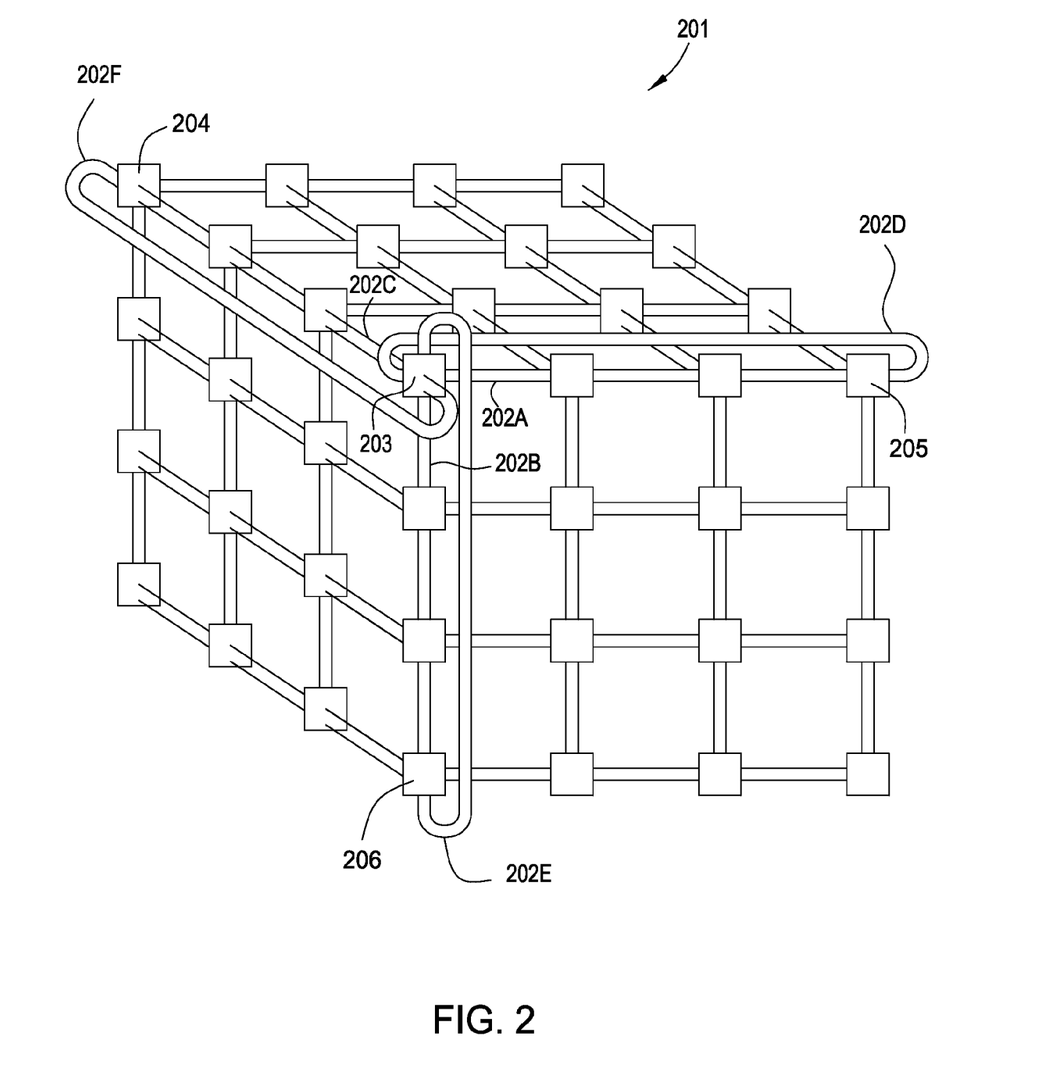
FIG. 2 is an illustration of a three-dimensional torus network of system, according to one embodiment of the invention.

FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 112 along with and an additional 1024 I/O nodes 111. Illustratively, each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3A:
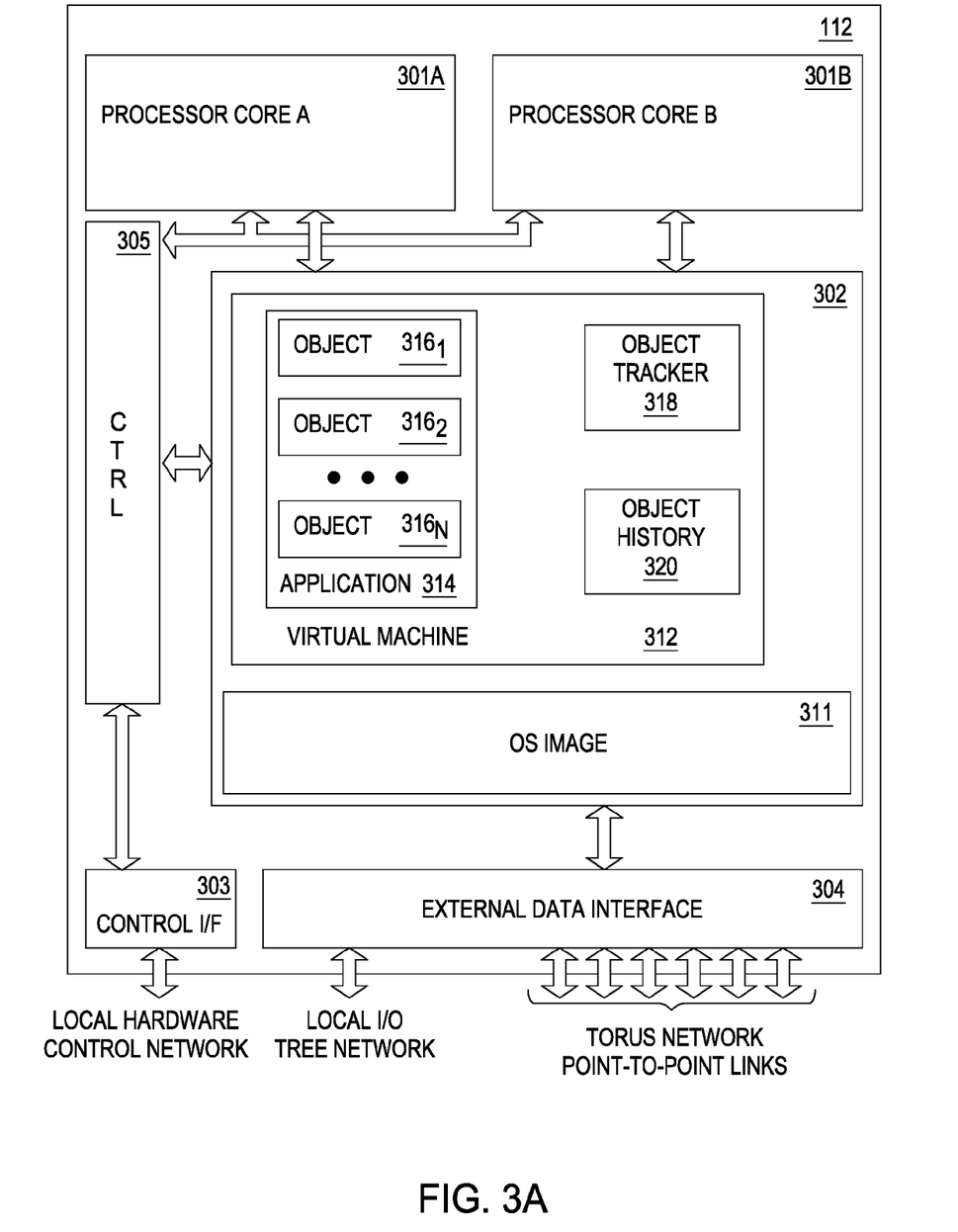
FIG. 3A illustrates components of a compute node of the system of FIG. 1, according to one embodiment of the invention.

FIG. 3A illustrates components of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3A, memory 302 stores an operating system image 311. Operating system image 311 provides a copy of a simplified-function operating system running on compute node 112, referred to as a compute node kernel. The compute node kernel provides a minimal set of functions required to support operation of the compute node 112. In one embodiment, a virtual machine 312 may also reside within memory 302. The virtual machine 312 running on computer node 112 may be configured to execute applications created for the virtual machine 312. For example, the virtual machine 312 may be an implementation of a Java® virtual machine and operating environment available from Sun Microsystems, Inc.

Furthermore, a copy of the virtual machine 312 may be present and executing on thousands of compute nodes 112, where, in one embodiment, each compute node executes the same application but maintains application data local to a given compute node 112. In another embodiment, some compute nodes may execute a different application, or simply remain idle. Further, applications running on the compute nodes 112 may be configured to share and transfer application data using well known message passing techniques (e.g., MPI or ARMCI).

Illustratively, virtual machine 312 is shown executing application 314. In the case of a Java® based virtual machine, application 314 may be written using a programming language and compiler configured to generate bytecode for the particular virtual machine 312. In turn, the virtual machine 312 may execute application 314 by generating native instructions from the bytecode. The native instructions may then be executed by one or more processor cores 301A and 301B.

While executing, the application 314 may instantiate objects $316_1$, $316_2$, $316_n$ by dynamically allocating memory. For example, the Java® programming language provides the "new" operator used to create an object and allocate memory at runtime for that object. Other programming languages provide similar constructs.

As illustrated, virtual machine 312 may also include an object tracker 318 and object history 320. In one embodiment, the object tracker 318 monitors and evaluates the objects $316_1$, $316_2$, $316_n$ to determine characteristics of the objects $316_1$, $316_2$, $316_n$. For example, as described in greater detail below, metrics such as object size, complexity, creation time, access frequency and the like may be tracked by object tracker 318. Subsequently, the object tracker 318 stores information indicative of the characteristics of objects $316_1$, $316_2$, $316_n$ in the object history 320. Thus, over time, object history 320 provides a profile of object behavior on a given node.

In one embodiment, the object tracker 318 may have a size-tracking thread that monitors the size of locally-stored objects $316_1$, $316_2$, $316_n$. Once the size of an object $316_1$, $316_2$, $316_n$ is determined, the actual size of the object $316_1$, $316_2$, $316_n$ may be stored in the object history 320. Further, the size of an object $316_1$, $316_2$, $316_n$ can change during execution of the application 314. Therefore, the object history 320 may be updated every time the size changes. In another embodiment, the object history 320 may be updated periodically. In yet another embodiment, the object history 320 may be updated once the size of the object $316_1$, $316_2$, $316_n$ reaches or exceeds a certain threshold. The threshold may be user-defined, or be provided by the virtual machine 312. In any case, once this threshold is met, it may be determined that the object $316_1$, $316_2$, $316_n$ is "large." Accordingly, the object history 320 may be updated to contain information that simply indicates that the object $316_1$, $316_2$, $316_n$ is large, rather than the actual size of the object $316_1$, $316_2$, $316_n$.

In one embodiment, object tracker 318 may also have an access-tracking thread that monitors how frequently the locally-stored objects $316_1$, $316_2$, $316_n$ are accessed. The access-tracking thread may measure the amount of accesses over a given period of time. If the number of accesses during the given period of time is below a certain threshold, the thread may determine that the object $316_1$, $316_2$, $316_n$ is infrequently used. Subsequently, the access-tracking thread may update the object history 320 with information indicating that the object $316_1$, $316_2$, $316_n$ is infrequently used.

The object history 320 may also store information obtained from generating a profile during execution of application 314. For example, when an object is created (or about to be created) on a compute node, a profiler (e.g., object tracker 318) may determine characteristics of that object. Once the characteristics are determined, they may be stored in the object history 320. In one embodiment, a profile of a given object type may be updated every time an object of that type is created. In another embodiment, to reduce computing overhead (such as processing time and memory space), a profile may be updated only when the object $316_1$, $316_2$, $316_n$ is first created. Furthermore, while embodiments of the invention may allow profiling of every object instantiated by the application 314, overhead may be reduced by not profiling objects having known characteristics (i.e. immutable objects) which do not change during execution.

In one embodiment, a technique known as code instrumentation may be used to profile the application 314. When using code instrumentation, a developer may insert special sequences of code in selected areas in the application 314. For example, to determine the creation time for an object $316_1$, $316_2$, $316_n$, the developer may insert a small piece of start code that starts a clock or timer before the creation of a new object. The developer may then also insert a similar piece of stop code that stops the clock or timer immediately after the object $316_1$, $316_2$, $316_n$ is created. In such a case, the creation time for the object $316_1$, $316_2$, $316_n$ is the value of the timer after it has been stopped.

Other profiling and code instrumentation techniques known in the art may be used to determine other characteristics of an object. For example, certain objects $316_1$, $316_2$, $316_n$, may have complex initialization procedures that may require a substantial amount of memory and processing from the CPU(S) 301A, 301B. The profiler may be able to measure the amount of memory and CPU usage required to create the object. If the memory and/or CPU usage needed to construct the object is above a certain threshold, the profiler may update the object history 320 with information indicating that the object $316_1$, $316_2$, $316_n$ is "expensive to construct."

Moreover, a profile of the lifespan of an object $316_1$, $316_2$, $316_n$ may also be obtained using profiling and code instrumentation techniques described above. For example, a profile may measure the length of time in which one of the objects $316_1$, $316_2$, $316_n$ is used (or accessed). If the length of time is below a certain threshold, the profiler may update the object history 320 with information indicating that the object $316_1$, $316_2$, $316_n$ is "short-lived."

It may be determined that objects $316_1$, $316_2$, $316_n$ may have more than one of the above-mentioned characteristics, collectively providing a profile of each given object. For example, one of the objects $316_1$, $316_2$, $316_n$ may be identified as having characteristics such as "large and infrequently used", "expensive to construct and infrequently used," "large and short-lived," etc.

As stated above, a copy of virtual machine 312 may be present and executing on thousands of compute nodes 112. In one embodiment, each virtual machine 312 may utilize a respective object tracker 318 and object history 320 to manage the memory 302 usage of the application 314 running on that compute node. For example, to conserve memory space 302 on compute node 112 (i.e. a local node), the virtual machine 312 may migrate a large (and infrequently accessed) object to another node (i.e. a remote node).

In one embodiment, once an object has been migrated, a trap mechanism may be used to manage requests to invoke methods of that object. The trap mechanism may be implemented using code instrumentation techniques known in the art. For example, a developer may insert a sequence of code that migrates the object back to the local node before invoking a method of that object. However, migrating objects back to the local node incurs additional overhead in the compute node 112. Therefore, in an alternative embodiment, the instrumentation may instead generate a remote procedure call to the remote node storing the migrated object. For example, Remote Method Invocation (RMI) Application Programming Interfaces (API's) provided by the Java programming language may be used. Other programming languages provide similar constructs.

In such a case, the migrated object remains in the remote node, thereby reducing any overhead from migrating the object back to the local node. However, if the migrated object is accessed frequently, compute node 112 may still suffer significant overhead from generating numerous remote procedure calls. Therefore, the virtual machine 312 may migrate large objects that are also "infrequently used." Consequently, in such a case, the local node conserves memory space 302 and also minimizes the performance impact of executing remote procedure calls.

Further, the virtual machine 312 may also migrate objects $316_1$, $316_2$, $316_n$ that are large and "short-lived." Migrated "short-lived" objects have a limited number of remote procedure calls to them because they exist for a small amount of time. Therefore, migrating objects that are large and "short-lived" may also conserve memory and minimize the performance impact of executing remote procedure calls.

Another type of object that may be migrated to a remote node is an immutable (i.e. static) object. An immutable object is one with data that does not change after object construction. For example, the Java® programming language provides classes such as String, BigDecimal, BigInteger as immutable objects. Other programming languages provide similar constructs. Typically, once an immutable object is allocated in memory, the memory is not de-allocated until the application finishes executing. Therefore, the memory consumed by the immutable object never becomes available for creating additional objects. In other words, the amount of available memory space for creating additional objects is reduced directly by an amount equal to the size of each immutable object created by an application. Creating large immutable objects simply magnifies this problem. Therefore, in one embodiment, large immutable objects created locally may be migrated to a remote node.

Another characteristic of an immutable object is that multiple nodes may share (and access) the same immutable object without concern for data corruption because data inside an immutable object does not change. In one embodiment, any one of thousands of compute nodes 112 may access an immutable object stored in a local node. As a result, the local node may suffer a significant performance impact by servicing thousands of requests. Therefore, in one embodiment, a large (or simply frequently accessed) immutable object may be migrated to a remote node dedicated to performing this activity.

In another embodiment, the virtual machine 312 may also be configured to create objects (in particular, large and infrequently used, large and short-lived, and immutable objects) directly on a remote node. That is, the virtual machine 312 does not instantiate the object locally. In such a case, the virtual machine 312 may examine the object history 320 related to an object scheduled to be created. Using the object history 320, the virtual machine 312 may determine that creating the scheduled object may consume a large amount of memory and computing resources. As a result, the virtual machine 312 may send a message requesting that the object be instantiated directly on a remote node, thereby reducing any performance impact suffered by first creating the object locally, and then subsequently migrating the object to the remote node.

For example, a virtual machine 312 running on a compute node 112 may determine that an object scheduled for creation is "expensive to construct," based on a historical performance profile of previous instances of this object. To avoid the performance impact suffered by creating an object of this type, the virtual machine 312 may cause instances of the object to be created on a remote node. In another embodiment, instances of objects having known characteristics (i.e., immutable/static objects) may also be directly created on a remote node.

Figure 3B:
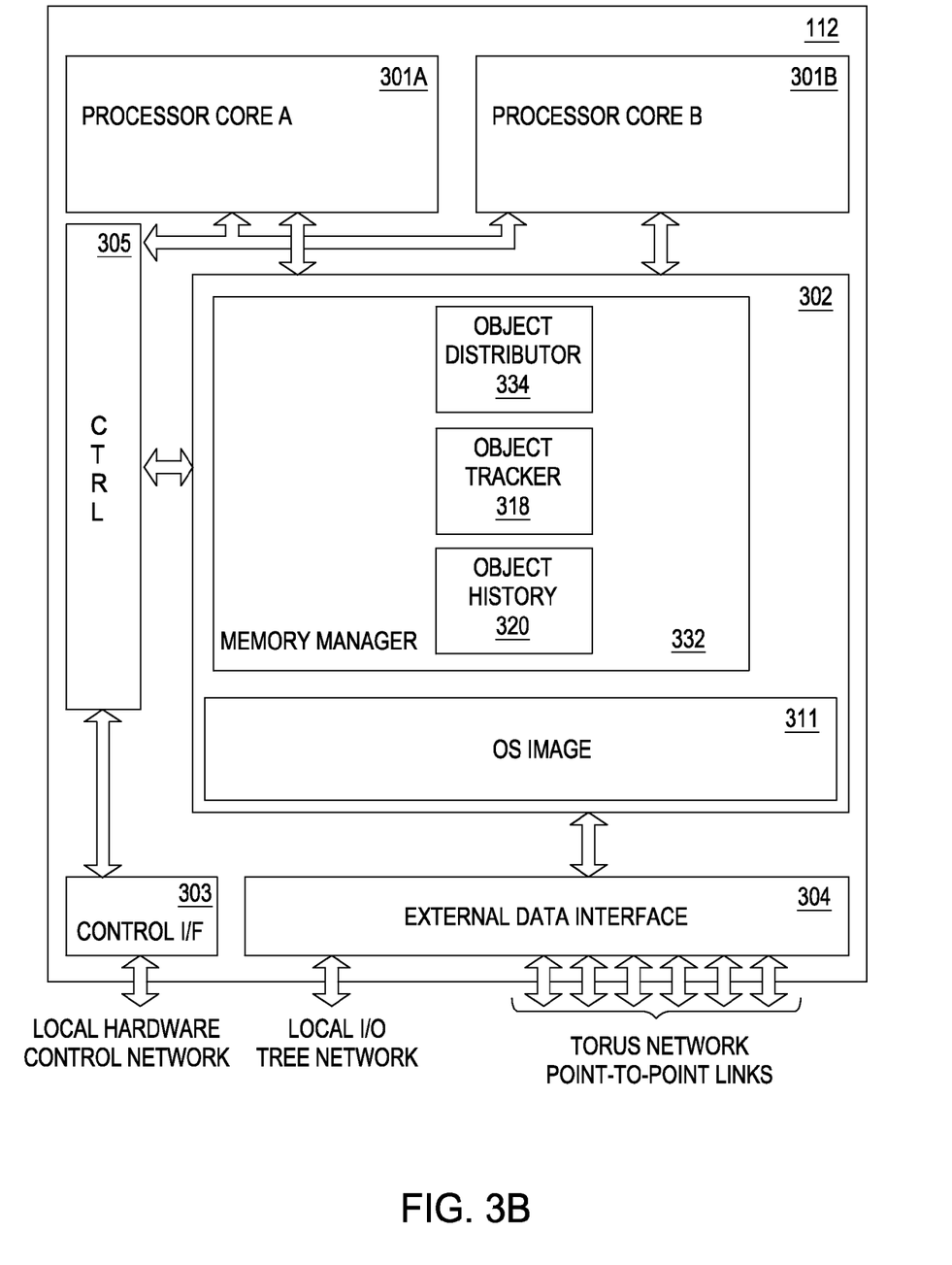
FIG. 3B illustrates a compute node of the system of FIG. 1, according to one embodiment of the invention.

In one embodiment, object migration across the system 100 may be managed by a memory manager application. For example, FIG. 3B illustrates a group of one or more compute nodes 330 (similar to the compute node 112 illustrated in FIG. 3A) configured as a memory manager for system 100. As shown in FIG. 3B, compute node 330 is shown executing a memory manager program 332.

In one embodiment, the memory manager program 332 may maintain a record of objects created by applications running on the compute nodes of the system 100. Furthermore, the memory manager program 332 may monitor the characteristics of those objects. In one embodiment, the memory manager program 332 may periodically communicate with the virtual machines 312 running on compute nodes 112 (using well-known message passing techniques such as MPI or ARMCI) to track the objects created in the system 100. In another embodiment, each virtual machine 312 in the system 100 may notify the memory manager program 332 that a new object has been created.

As shown, compute node 330 may also include an object tracker 318, an object history 320, and an object distributor 334. In this embodiment, the object tracker may be configured to monitor and evaluate objects located in thousands of compute nodes 112 instead of a single compute node as illustrated in FIG. 3A. Accordingly, the object history 320 stores characteristics related to objects created on other compute nodes of computer system 100.

For example, a size-tracking thread of object tracker 318 may periodically communicate with virtual machines 312 executing in the system 100 to inquire about the size of the objects created on the compute nodes 112. Alternatively, the virtual machine 312 on a given compute node may provide the access-tracking thread with relevant information when an object is accessed by an application running on that compute node. The object distributor 334 may use this information to determine (using techniques discussed above) which objects to migrate from one compute node 112 to another. Upon making this determination, the memory manager program 332 may instruct a virtual machine 312, running an application with an object ready for migration, to migrate the that object to another node.

According to an embodiment, the memory manager program 332 may also have the functionality to consolidate multiple copies of certain objects into one object. For example, consider an immutable object locally created on a compute node 112 having the same characteristics (i.e. size, data type, etc.) as another immutable object created locally on another compute node 112. As stated earlier, immutable objects may be shared between different nodes. Therefore, having multiple copies of the same immutable object is redundant, and can therefore be a waste of memory space.

Thus, the memory manager program 332 may consolidate copies of such immutable objects into a single copy. For example, in one embodiment, the memory manager program 332 may search its record of objects to locate immutable objects having the same characteristics (i.e. identical immutable objects). Once located, the memory manager program 332 may instruct a virtual machine 312, running on a compute node 112 having a copy of the immutable object, to migrate the immutable objects to a remote node. Thereafter, the memory manager program 332 may also instruct that virtual machine 312 to de-allocate the immutable object from local memory. Moreover, the memory manager program 332 may also instruct other virtual machines 312, running on compute nodes having a copy of the immutable object, to de-allocate their copies as well. Consequently, all the compute nodes 112 originally having a copy of the identical immutable object may now access that object located at the remote node (i.e. via remote procedure calls).

Figure 4:
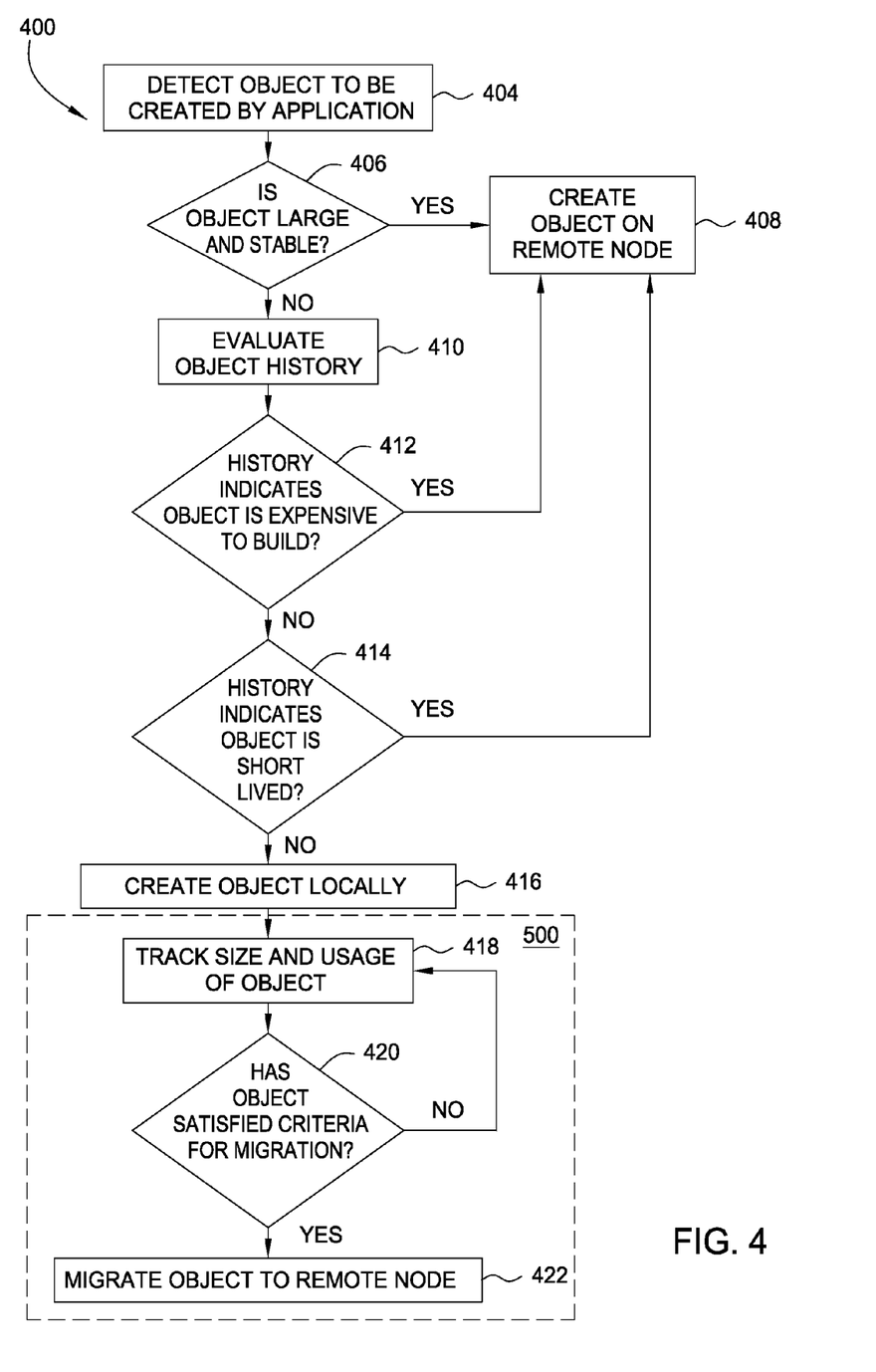
FIG. 4 is a flowchart illustrating a method for object creation and migration, according to one embodiment of the invention.
Figure 5:
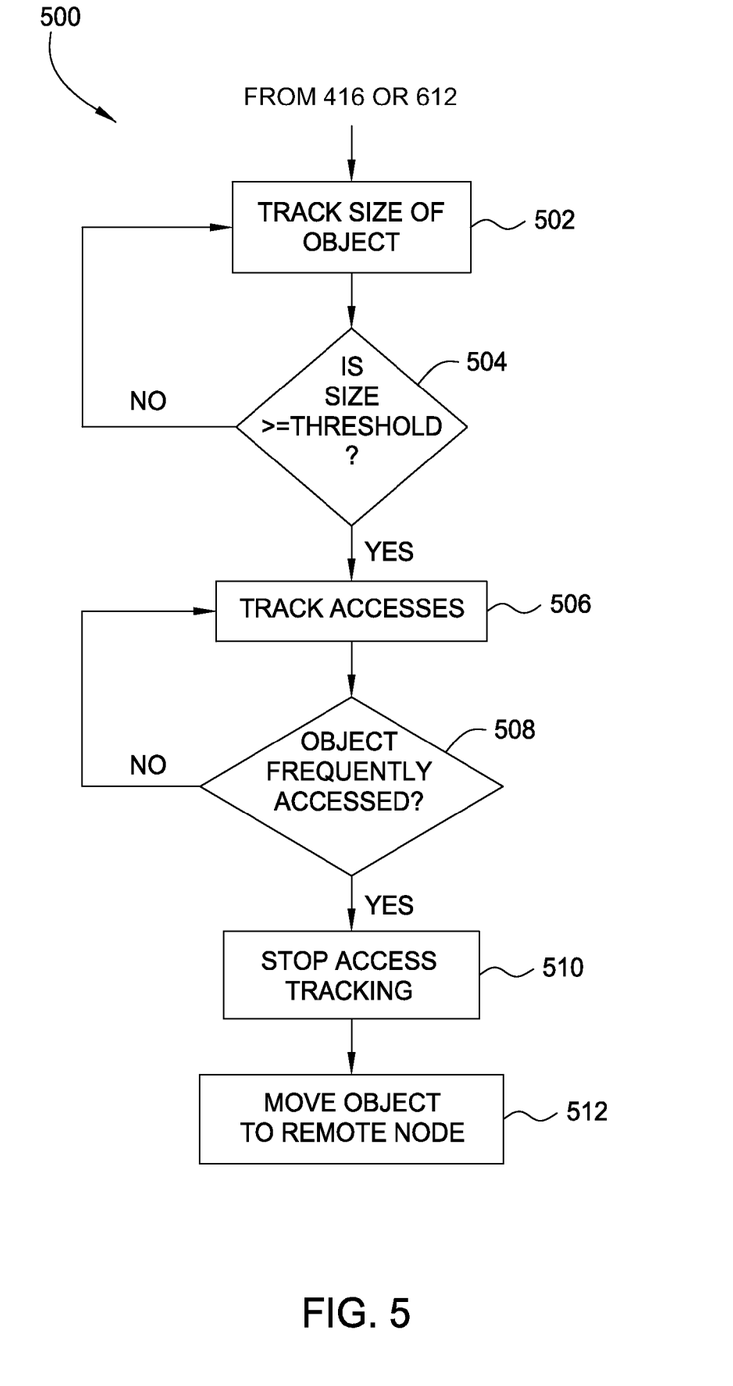
FIG. 5 is a flowchart illustrating the method for object migration as illustrated in FIG. 4, according to one embodiment of the invention.

Example operations for object creation and migration are further discussed in reference to FIGS. 4-5. FIG. 4 illustrates a method 400 to manage memory across a plurality of compute nodes 112, according to one embodiment of the invention. As shown, the method begins at step 404, where the virtual machine 312 detects that an application 314 is about to instantiate a new object (e.g., using the new operator). Next, the virtual machine 312 may determine if the object meets the criteria for creation on a remote node. For example, at step 406, the virtual machine may determine that the object about to be created is large and immutable (i.e. static). If so, the operations proceed to step 408, where the object is created on a remote node. Thereafter, method 400 returns to step 404, where another object is evaluated. In one embodiment, a large immutable object may first be created on a local node, and subsequently migrated to a remote node.

At step 406, if it is determined that the object is not large and immutable, the operations proceed to step 410. At step 410, the virtual machine 312 determines if the object meets other criteria for creating the object on a remote node, e.g., by evaluating the object history 320. If the object history 320 indicates that the object is either expensive to build (at step 412) or large and short-lived (at step 414) the operations proceed to step 408. As stated earlier, at step 408, the object is created on a remote node. However, if the object history does not indicate the object is either expensive to construct or large and short-lived, the object is created on the compute node at step 416.

At step 418, once an object is created locally, the object tracker 318 may track the size and usage of that object. For example, the object tracker 318 may be configured to monitor each time a method of that object is invoked by the application. Similarly, the object tracker 318 may monitor metrics such as object size, frequency of method invocation, and the like. At step 420, it may be determined that the object has satisfied criteria for migration. If so, at step 422, the object may be migrated to a remote node. Alternatively, if the object does not satisfy criteria for migration, the method 400 returns to step 418 where the object tracker 318 continues to track objects instantiated by the application. FIG. 5 further illustrates an example of operations performed by the object tracker 318.

More specifically, FIG. 5 illustrates a method 500 to track the size and number of accesses of a given object instantiated by a compute node of a parallel computing system, according to one embodiment of the invention. As shown, method 500 begins at step 502, where the size of a given object is tracked by the size-tracking thread of the object tracker 318. At step 504, if it is determined that the size of the object exceeds a size threshold, the operations proceed to step 506. If, however, the size of the object is below the size threshold, then the size-tracking thread continues to track the size of the object at step 502.

Otherwise, at step 506, the object is tracked by the access-tracking thread of the object tracker 320. If, at step 508, it is determined that the object is not frequently accessed (i.e. is infrequently used), the operations proceed to step 510. If, however, it is determined that the object is frequently accessed, the access-tracking thread continues to track the number of accesses to the object at step 506.

It may now be determined whether the object is both large and infrequently used, which, in one embodiment, may be the criteria for migrating the object to a remote node (for reasons discussed above). In one embodiment, once a object satisfies the criteria for migration, the object tracker may stop tracking the object (to reduce overhead in the compute node 112 caused by the tracking) at step 510.

At step 512, the object may be migrated to a remote node. In one embodiment, the remote node may perform size tracking on the object using a respective object tracker 318 stored on that compute node. If the size of the object decreases below the size threshold (as illustrated at step 504) the object may be migrated back to the local node. In another embodiment, before migrating an object to a remote node, the virtual machine 312 located on the local node may communicate with the remote node to determine whether the remote node has enough memory space available for the object. If the remote node has enough memory space available, the object may be migrated to that remote node. Otherwise, if the remote node does not have enough memory space, the local node may attempt to migrate the object to another remote node.

Figure 6:
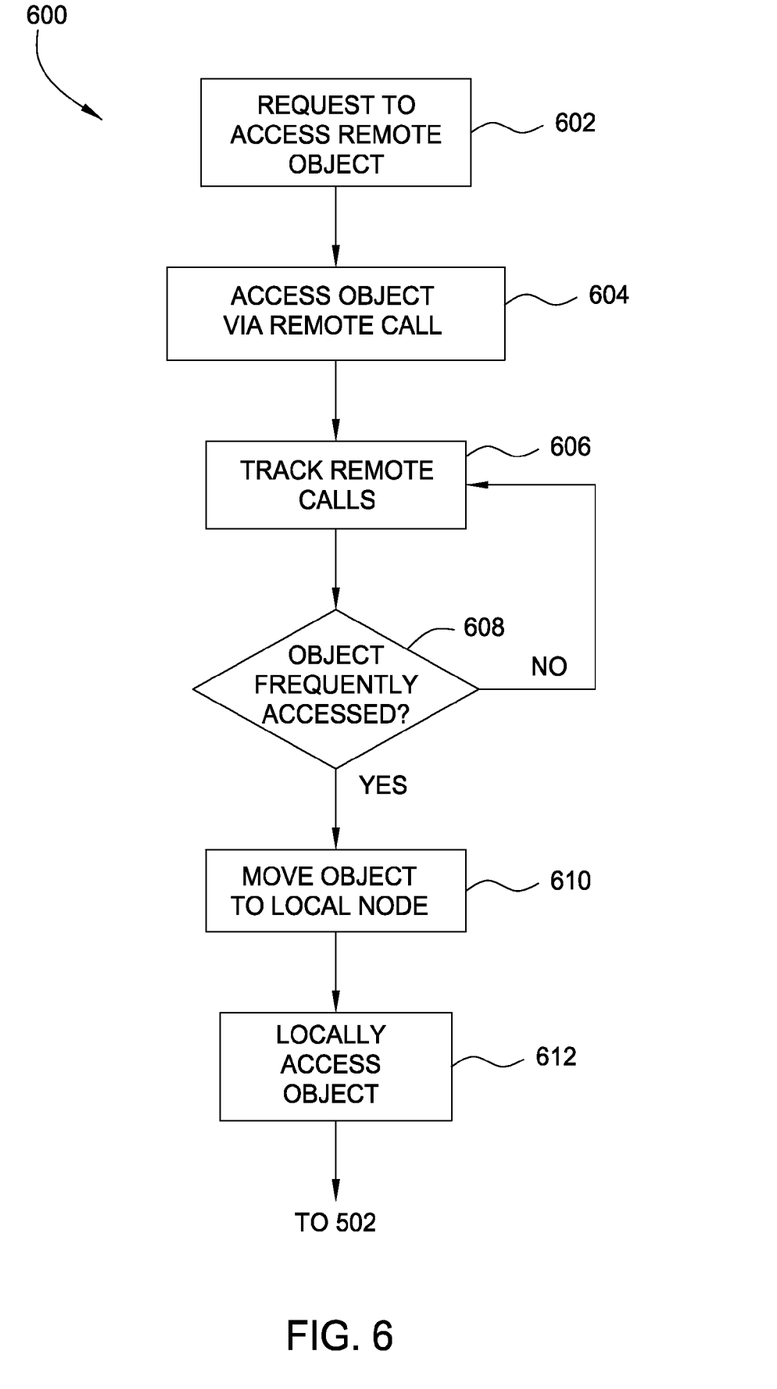
FIG. 6 is a flowchart illustrating a method for migration node according to one embodiment of the invention.

FIG. 6 illustrates a method 600 performed on an object migrated to a remote node, according to one embodiment of the invention. As shown, the operations begin at step 602 where a local node sends a request to the remote node to access the object. In one embodiment, the local node may simply request the remote node migrate the object back to the local node. In such a case, the local node may then access the object directly.

Alternatively, however, at step 604, the local node may access the object on the remote node, e.g., via remote procedure calls. At step 606, the remote node, may track the number of remote procedure calls received for a particular object using the object tracker 318 executing on the remote node. If, at step 608, it is determined that the object is not frequently accessed (i.e. infrequently used), the operations return to step 606, where the object continues to be tracked. If, however, it is determined that the object is frequently accessed, than at step 610, the remote node may migrate the object back to the local node. Consequently, at step 612, the object may be accessed directly by the local node. Once the object is returned to the local node, the local node may recommence the tracking process on the object starting at step 502 of FIG. 5.

Advantageously, as described herein, embodiments of the invention enable application programs running across multiple compute nodes of a highly-parallel system to selectively migrate objects from one node to another. For example, an application running a given compute one node may instantiate numerous objects and migrate some to another node. Doing so may free memory space on that node for other uses; improving system performance, particularly where large and infrequently used objects are migrated. Further, in one embodiment upon detecting that an application is about to instantiate a object, a compute node may determine that creating the object may consume a sufficiently large amount of computing resources to justify creating the object on a remote node. Doing so allows a node to intelligently trade off between locally consuming memory for a object on the node, and the usefulness of having the object on a remote node.

While the foregoing is directed to embodiments of the present invention, other and further embodiments of the invention may be devised without departing from the basic scope thereof, and the scope thereof is determined by the claims that follow.

What is claimed is:

1. A method for creating objects in a multi-node computing system, comprising:
monitoring an application being executed on a plurality of compute nodes of the multi-node system to generate a performance profile for one or more objects instantiated by the application during execution of the application, wherein each performance profile indicates performance characteristics for instances of a respective object type;
detecting that the application program being executed by a first compute node of the multi-node system is going to instantiate a first object of a first object type;
evaluating the performance profile corresponding to the first object type;
based on the evaluation, intercepting a request by the application program to create an instance of the first object on the first compute node;
directing the request to a second compute node;
creating an instance of the first object on the second compute node; and
wherein the performance profile corresponding to the first object type profiles a computing time required to construct instances of the first object type, and wherein the first object is created on the second compute node when the computing time required to construct instances of the first object type exceed a specified threshold.

2. The method of claim 1, wherein the performance profile corresponding to the first object type further indicates that instances of the first object exceed a specified size threshold.

3. The method of claim 1, wherein the performance profile corresponding to the first object type further profiles an access frequency for instances of the first object type and wherein the first object is created on the second compute node when the access frequency is below a specified threshold.

4. The method of claim 1, further comprising:
accessing the first object on the second compute node via a remote procedure call invoked on the first compute node.

5. The method of claim 4, further comprising:
monitoring a number of remote procedure calls to the first object;
migrating the first object to the first compute node if the number of remote procedure calls to the first object exceeds a specified threshold.

6. The method of claim 5, wherein the specified threshold defines a maximum number of remote procedure calls to the first object over a given period of time.

7. The method of claim 1, wherein the first object is defined by the application program is an immutable object.

8. A computer-readable storage medium containing a program which, when executed by a processor, performs operations for creating objects on a multi-node system, the operations comprising:
monitoring an application being executed on a plurality of compute nodes of the multi-node system to generate a performance profile for one or more objects instantiated by the application during execution of the application, wherein each performance profile indicates performance characteristics for instances of a respective object type;
detecting that the application program being executed by a first compute node of the multi-node system is going to instantiate a first object of a first object type;
evaluating the performance profile corresponding to the first object type;
based on the evaluation, intercepting a request by the application program to create an instance of the first object on the first compute node;
directing the request to a second compute node;
creating an instance of the first object on the second compute node; and
wherein the performance profile corresponding to the first object type profiles a computing time required to construct instances of the first object type, and wherein the first object is created on the second compute node when the computing time required to construct instances of the first object type exceed a specified threshold.

9. The computer-readable storage medium of claim 8, wherein the performance profile corresponding to the first object type further indicates that instances of the first object exceed a specified size threshold.

10. The computer-readable storage medium of claim 8, wherein the performance profile corresponding to the first object type further profiles an access frequency for instances of the first object type and wherein the first object is created on the second compute node when the access frequency is below a specified threshold.

11. The computer-readable storage medium of claim 8, further comprising:
    accessing the first object on the second compute node via a remote procedure call invoked on the first compute node.

12. The computer-readable storage medium of claim 11, further comprising:
    monitoring a number of remote procedure calls to the first object;
    migrating the first object to the first compute node if the number of remote procedure calls to the first object exceeds a specified threshold.

13. The computer-readable storage medium of claim 12, wherein the specified threshold defines a maximum number of remote procedure calls to the first object over a given period of time.

14. The computer-readable storage medium of claim 8, wherein the first object is defined by the application program is an immutable object.

15. A parallel computing system, comprising:
    at least one storage node, having a processor and memory, dedicated to storing objects instantiated by an application program; and
    a plurality of compute nodes, each having a processor and memory, configured to execute the application program and a program configured for creating objects on a multi-node system by performing the steps of:
        monitoring an application being executed on the plurality of compute nodes to generate a performance profile for one or more objects instantiated by the application during execution of the application, wherein each performance profile indicates performance characteristics for instances of a respective object type;
        detecting that the application program being executed by a first node of the plurality of compute nodes is going to instantiate a first object of a first object type;
        evaluating the performance profile corresponding to the first object type;
        based on the evaluation, intercepting a request by the application program to create an instance of the first object on the first compute node;
        directing the request to the at least one storage node;
        creating an instance of the first object one of the storage nodes; and
        wherein the performance profile corresponding to the first object type profiles a computing time required to construct instances of the first object type, and wherein the first object is created on the second compute node when the computing time required to construct instances of the first object type exceed a specified threshold.

16. The system of claim 15, wherein the performance profile corresponding to the first object type further indicates that instances of the first object exceed a specified size threshold.

17. The system of claim 15, wherein the performance profile corresponding to the first object type further profiles an access frequency for instances of the first object type and wherein the first object is created on the storage node when the access frequency is below a specified threshold.

18. The system of claim 15, wherein the application is configured to access the first object on the storage node via a remote procedure call invoked on the first compute node.

19. The system of claim 18, wherein the program is further configured to:
    monitor a number of remote procedure calls to the first object;
    migrate the first object to at least one of the plurality of compute nodes if the number of remote procedure calls to the first object exceeds a specified threshold.

20. The system of claim 19, wherein the specified threshold defines a maximum number of remote procedure calls to the first object over a given period of time.

21. The system of claim 15, wherein the first object is defined by the application program is an immutable object.

* * * * *